July 12, 1932.  W. C. JACKSON  1,867,156
CLAMPING DEVICE
Filed March 23, 1932
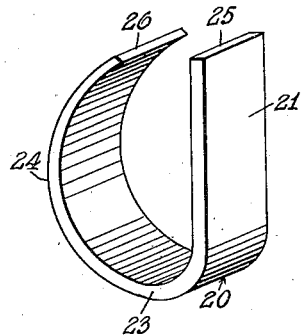
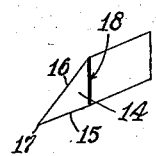
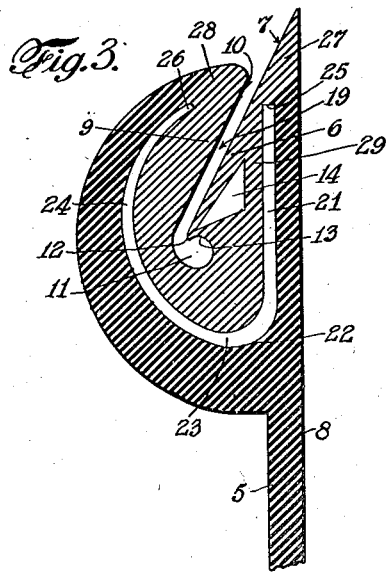
INVENTOR
WALTER C. JACKSON
BY
ATTORNEY Patented July 12, 1932

1,867,156

UNITED STATES PATENT OFFICE

WALTER C. JACKSON, OF RAHWAY, NEW JERSEY, ASSIGNOR TO TINGLEY RELIANCE RUBBER CORPORATION, OF RAHWAY, NEW JERSEY, A CORPORATION OF NEW JERSEY

CLAMPING DEVICE

Application filed March 23, 1932. Serial No. 600,623.

This invention relates to clamps adapted to be used in attaching various articles or devices to thin bodies, particularly bodies of sheet material such, for instance, as the wheel fenders of automobiles.

One of the objects of my invention is to provide means for reinforcing the rubber bead engaging lip of clamps such as those used for securing various devices to the edges of automobile fenders.

The principal purpose of my invention is to provide a strong, durable and efficient reinforcement for the rubber engaging portions of vulcanized rubber clamps.

And other objects of the invention will be presented in the detailed description of the drawing.

In the drawing accompanying the specification one practicable embodiment of my invention is illustrated which, at the present time, I regard as the preferred form, in which drawing:

Figure 1 shows in perspective the rigid or reinforcing element of the clamp.

Fig. 2 shows in perspective the rigid lip stiffening or reinforcing element, and Fig. 3 is a longitudinal section of the complete clamp.

The clamp, in its preferred form, is composed of fairly soft vulcanized rubber. As the clamp is employed for securing some depending device to some structure, as for instance a splash guard apron to the end of an automobile fender, it is preferably molded and vulcanized integrally with the upper end of the apron 5, Fig. 3. In this instance one of the jaws as 6 is produced by the thickened upper part of the apron and is shown formed with a fender engaging face 7 sloping downwardly and outwardly from the upper end. When reference is made to outwardly and inwardly it will be assumed that the face 8 of the apron will be directed inwardly of the fender to which the clamp is attached, and that the opposite side will be directed outwardly and exposed more particularly to view than is the so-called inner face 8. The other of the jaws 9 extends upwardly and has a face 10 disposed opposite to the face 7 for most of the extent of the latter and is preferably given substantially the same direction. These two faces extend downwardly in substantially parallel relation and widen out into a recess 11 which is adapted to receive the bead usually formed on the extreme lower edge of an automobile fender, when the clamp is forced up onto this.

The fender engaging face 7 of the jaw 6 terminates in its lower end in a lip 12, this lip being given a rather sharp formation by the upward curve as at 13 of the wall of the cavity 11. The lip 12, just described, is for the purpose of engaging the crease or corner formed at the upper side of the bead on the fender and, in cooperation with the other parts of the device, for holding the clamp against dislodgement after it has once been properly applied to the fender.

While it is quite a simple matter for the rubber manufacturer to make clamps of this general description entirely of rubber and having the capability of holding their position when applied, yet it is a well-known fact that rubber, when it is subjected to continuous tension, becomes tired. When this phenomenon occurs in a clamp of this character the clamp will release its hold and fall off taking with it whatever device it may have supported. It has further been discovered that by reinforcing the rubber its ability to serve as the jaws of a clamp is augmented and the normal life of the rubber is vastly extended.

In accordance with my invention I propose to embed within the body of the jaw 6 a reinforcing or stiffening device 14 which is free of all support save that of the rubber which completely surrounds and envelops it. This body may be formed of some suitable metal, preferably hard, or it may be formed of hard rubber previously vulcanized and incorporated in the mass of rubber forming the jaw 6. Or it may be molded of some rubber composition and in its green state, or possibly partly cured, embedded in the mass of rubber forming such jaw and upon the application of a heat and pressure proper to vulcanize the general mass of rubber it will be also vulcanized integrally with the rest of the rubber, but having much more rigidity and stiffness than the surrounding mass.

In the preferred form the reinforcing member 14 will be triangular in cross-section, its lower and upper sides 15 and 16 preferably forming an acute angle, the apex 17 of which is located close up to the lip 12, but preferably sufficiently far away from the walls or faces 7 and 13 that it is completely covered with rubber so that neither in the application of the clamp to the fender or to continued occupancy of a position therein the material of this element 14 will not come in contact with the automobile fender, but the surface of such fender will be safeguarded against being scratched or marred. This body 14 is illustrated in the form of a wedge having a sharp edge which is directed downwardly and into the bead engaging lip.

In the preferred formation of this reinforcing body 14 and its location its upper face 16 slants inwardly or backwardly a little more than does the face of the jaw 7 and the lower face 15 is preferably at a greater angle to the face 7, but preferably at an acute angle. In many locations it is also desirable to have the rear face 18 of the body 14 disposed in a plane substantially parallel with the plane of the inner face 8 of the device as a whole.

The mass of soft rubber comprising the clamp affords the spring action for permitting the parts to yield upon the application of the clamp to the fender and permits the body 14 to yield away from the bead of the fender as it transverses the slot 19 between the jaw faces 7 and 10, and also permits the parts to assume substantially their normal position upon the bead entering the recess 11. After the bead has passed below the lip 12 and the lower end 17 of the body 14 this lip moves outwardly and into the crease above the bead and the body 14 moves with the rubber and stiffens the structure, particularly the lip 12, so that it will not readily yield and release the hold upon the fender and upon the bead. As a matter of fact it is only with the greatest difficulty that the clamp can be detached from a fender after having once been properly applied. The member 14 may, if desired, be so proportioned and located in relation to the other parts of the device that the clamp having been once properly applied cannot be removed without complete destruction of some portion of the device.

The reinforcing member 14 is somewhat in the nature of a latch. It might be described as a free latch because it is not directly connected with the other metal or rigid parts of the structure, presently to be described, nor is it articulated to these after the manner of most latches. It is also free in that it may be regarded as floating within a mass of rubber forming the jaw 6. When such rubber is subjected to a compressive force which causes it to yield and flow away from its original position the latch body 14 moves with it, very much as if the rubber were a liquid mass in which the body 14 is suspended.

For the purpose of sustaining and reinforcing the rubber comprising the jaws 6 and 9 I mount within them a practically rigid body 20 which has an upstanding member 21 passing from the region well within the body 22 of the clamp up into the portion forming the jaw 6 and well past the upper portion 16 of the reinforcing body 14. The member 20 is bent upon itself as at 23 within the body 22 of the clamp and has an extension 24 ending at approximately the height of the member 21 and preferably well up toward the free end of the jaw 9. This member 20 is preferably formed of rigid metal, or that is of metal sufficiently rigid, or the structure is sufficiently rigid that it will yield but little when the bead of an automobile fender is forced down the slot 19. The only yieldability permitted in this clamp is that of the rubber located within the reinforcing member 20; that is between the uprights 21 and 24 and the bend 23, except, of course, that which takes place above the ends 25 and 26 and at the sides of the entire member. The rubber outwardly of the upright 24 and inwardly of the upright 21 serves two purposes, one for encasing and supporting the member 20, and the other for preventing such member injuring some parts of the auto to which the device is applied.

Although the operation of the clamp is doubtless quite obvious from the drawing and from the description which has preceded, yet it might not be amiss to state at this point that when the clamp is applied to the fender of an automobile the bead at the lower edge of the fender will be entered between the soft portions 27 and 28 of the free ends of the jaws. The clamp will then be forced up on the fender end bringing the bead within the ends 25 and 26 of the reinforcing body 20 whereupon, owing to the practical rigidity of this body, the further yieldability of the clamp is afforded by the compression or distortion of the rubber located between the arms 21 and 24 of this body. If the clamp is still further forced up on the end of the fender and the body 14 is caused to approach the bead this body will move rearwardly and toward the member 21 distorting behind it and also below it the soft rubber.

This displacement action takes place until the lip 12 snaps past the bead which has been forced into the cavity 11. At that moment the rubber assumes practically its former position and brings the edge 17 of the member 14 into the crease above the bead. For most applications the distance apart of the faces 7 and 10 which form the slot 19 will be practically equal to the thickness of the metal of the fender on which the device is intended to be applied so that there will be a slight frictional or gripping action, the intensity of which gripping will, of course, be regulated by the distance apart of these faces.

In some instances it may be found desirable to employ a softer rubber within the rigid member 20 than that of which the rest of the clamp is constructed. In any event the rubber at the region indicated by the reference character 29 must be sufficiently soft to permit the desired freedom of movement of the latch member 14. It also may be found desirable to employ this softer rubber only at the region 29 behind the latch 14 and at the upper portions of the rubber forming the faces 7 and 10 and to form the lower portion of the body within the rigid member 20 of a harded rubber. In Fig. 3 the cross-section lines which are lighter than those used throughout the figure are intended to represent a softer rubber.

Having thus described my invention, what I claim and desire to secure by Letters Patent is:

1. A rubber body formed into a pair of jaws having opposing faces presenting a slot between them opening into an enlarged cavity, there being a lip formed at the juncture of one of the jaw faces and the wall of the enlarged cavity, and a triangularly shaped free body of harder material than the rubber body and disposed within the mass of rubber rearwardly of the said lip.

2. A rubber body formed into a pair of jaws having opposing faces presenting a slot between them opening into an enlarged cavity, there being a lip formed at the juncture of one of the jaw faces and the wall of the enlarged cavity, and a free body of harder material than the rubber body and encased within the mass of rubber rearwardly of the jaw face terminating in said lip, such body being of triangular cross-section, the sides being disposed at an acute angle in relation to each other, and both at an acute angle to the plane of the said jaw faces, the apex being located rearwardly of such lip and directed downwardly.

3. A clamp comprising a mass of soft rubber having two extended jaws formed with opposing faces presenting a slot between them and also formed with an enlarged cavity in communication with such slot, there being a lip formed at the juncture of one of the jaw faces and the wall of the enlarged cavity, and a wedge-shaped body having a sharp edge located within the mass of rubber, such edge being directed downwardly and into the said lip.

4. A rubber body formed into a pair of jaws having opposing faces presenting a slot between them opening into an enlarged cavity, there being a lip formed at the juncture of one of the jaw faces and the wall of the enlarged cavity, a free body of harder material than the rubber body and disposed within the mass of rubber rearwardly of the said lip, and a rigid reinforcing member embedded in the mass of rubber comprising the body and the jaws and located in such position in relation to the major portions of the said opposing faces as to restrain the normal relative outward movement of the entire mass of rubber constituting the jaws upon the passage of some body along the slot and between the said opposing faces.

5. A rubber body formed into a pair of jaws having opposing faces presenting a slot between them opening into an enlarged cavity, there being a lip formed at the juncture of one of the jaw faces and the wall of the enlarged cavity, and a free body of harder material than the rubber body and encased within the mass of rubber rearwardly of the jaw face terminating in said lip, such body being of triangular cross-section, the sides being disposed at an acute angle in relation to each other, and both at an acute angle to the plane of the said jaw faces, the apex being located rearwardly of such lip and directed downwardly, and a rigid reinforcing member embedded in the mass of rubber comprising the body and the jaws and located in such position in relation to the major portions of the said opposing faces as to restrain the normal relative outward movement of the entire mass of rubber constituting the jaws upon the passage of some body along the slot and between the said opposing faces.

6. A clamp comprising a mass of soft rubber having two extended jaws formed with opposing faces presenting a slot between them and also formed with an enlarged cavity in communication with such slot, there being a lip formed at the juncture of one of the jaw faces and the wall of the enlarged cavity, a wedge-shaped body having a sharp edge located within the mass of rubber, such edge being directed downwardly and into the said lip, and a rigid reinforcing member embedded in the mass of rubber comprising the body and the jaws and located in such position in relation to the major portions of the said opposing faces as to restrain the normal relative outward movement of the entire mass of rubber constituting the jaws upon the passage of some body along the slot and between the said opposing faces, the wedge-shaped latch member being free in a portion of the mass of rubber located within the rigid reinforcing member.

7. A clamp comprising a mass of soft rubber having two extending jaws formed with opposing engaging faces presenting a slot between them, and also formed with a cavity in communication with such slot, and a rigid body encased within such mass and having a pair of upstanding members passing from the region well within the body of the clamp up into the portion forming the jaws, such member being bent upon itself within the body portion to the rigid upstanding members ending below the outer ends of the jaws and below the entrance portion of the slot formed between their opposing faces so that there are soft portions at the free ends of the jaws, and another rigid body triangular in shape located within the mass of rubber forming one of the jaws between its engaging face and the upstanding rigid member therein and free of such rigid member.

Signed at Rahway, New Jersey, this 8th day of March, 1932.

WALTER C. JACKSON.